(12) United States Patent
Liukkonen et al.

(10) Patent No.: US 6,230,214 B1
(45) Date of Patent: May 8, 2001

(54) PORTABLE ELECTRONIC DEVICES

(75) Inventors: Jari Liukkonen; Simo Vapaakoski, both of Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/136,127

(22) Filed: Aug. 18, 1998

(30) Foreign Application Priority Data

Aug. 20, 1997 (FI) ........................................ 973415

(51) Int. Cl.$^7$ ........................................ G06F 3/00
(52) U.S. Cl. .................. 710/1; 455/418; 455/557; 455/600; 713/310
(58) Field of Search .................. 710/1; 713/310; 455/557, 600, 418

(56) References Cited

U.S. PATENT DOCUMENTS

| | | | | |
|---|---|---|---|---|
| 4,259,746 | * | 3/1981 | Sandstedt | 455/600 |
| 5,559,800 | * | 9/1996 | Mousseau et al. | 370/85.13 |
| 5,627,878 | * | 5/1997 | Strauch et al. | 379/58 |
| 5,657,371 | | 8/1997 | Suomi et al. | 455/418 |
| 5,659,773 | * | 8/1997 | Huynh et al. | 710/1 |
| 5,793,866 | * | 8/1998 | Brown et al. | 380/2 |
| 5,802,467 | * | 9/1998 | Salazar et al. | 455/420 |
| 5,809,115 | * | 9/1998 | Inkinen | 379/93.05 |
| 5,838,472 | * | 11/1998 | Welch et al. | 359/155 |
| 5,864,708 | * | 1/1999 | Croft et al. | 710/1 |
| 5,870,615 | * | 2/1999 | Bar-On et al. | 713/310 |
| 5,903,849 | * | 5/1999 | Selin et al. | 455/557 |
| 5,936,539 | * | 8/1999 | Fuchs | 340/825.07 |

FOREIGN PATENT DOCUMENTS

| | | |
|---|---|---|
| 0 585 030 A1 | 3/1994 | (EP) . |
| 0 595 450 A3 | 5/1994 | (EP) . |
| WO 96/05666 | 2/1996 | (WO) . |

* cited by examiner

*Primary Examiner*—Ayaz Sheikh
*Assistant Examiner*—Frantz B. Jean
(74) *Attorney, Agent, or Firm*—Perman & Green, LLP

(57) ABSTRACT

A data transmission system comprising a mobile communication device such as a mobile telephone 1, having an infra-red input/output communications port 3 arranged in a first mode of operation to transmit data between the portable device and a remote electronic device 2 via a wireless transmission link. The communication device has coupling means 11a, 11b associated with the infra-red communications port 3 for coupling a first end of a data transmission cable 8 to the infra-red communications port 3, whereby in a second mode of operation data can be transmitted between the portable device 1 and the remote electronic 2 device via said infra-red communications port 3 and the cable 8.

16 Claims, 4 Drawing Sheets

PORTABLE ELECTRONIC DEVICES

FIELD OF THE INVENTION

The present invention relates to portable electronic devices and more particularly to a method and apparatus for transmitting data between a portable electronic device and a remote electronic device.

BACKGROUND OF THE INVENTION

Many different types of portable electronic devices are in use today. In particular, notebook computers, palm-top computers, and personal digital assistants (PDA) are commonplace. The use of mobile telephones is also widespread and it is expected that in the near future combined mobile telephone/PDA devices will be widely used.

With portable electronic devices which store large amounts of data and/or operating instructions, there is often a need to transfer data between the portable device and a remote electronic device such as a computer or printer. Conventionally, such data transfer is achieved by providing both devices with serial input/output (I/O) ports (e.g. RS232) and by interconnecting these ports with an electrical cable. More recently, some portable electronic devices have been provided with an infra-red (IR) I/O port to allow devices to transfer data via a wireless infra-red transmission link. A wireless link avoids the need to connect a cable between the communicating devices, making the setting up of the transmission link a relatively simple procedure and also reducing costs. However, IR links do not function, or do not function well, where there is no direct line of sight between the communicating devices and/or where electromagnetic interference is present. Both of these problems can arise when it is desired to couple a mobile telephone/PDA device to some other electronic device, for example a hands-free controller, inside a vehicle. Often, the only solution to this problem is to provide portable electronic devices with an additional I/O port which can be connected via a cable to a remote device in the event that the IR link does not function satisfactorily.

Typically, the space occupied by, and complexity of an IR interface port is considerably less than that of an electromechanical I/O port. Hence IR links are extremely desirable where portable electronic devices are concerned. However, this advantage is lost when it is necessary to include both electromechanical and IR input ports in the same device. The need for two such ports also increases the cost of the device.

SUMMARY OF THE INVENTION

It is an object of the present invention to overcome or at least mitigate the above noted disadvantages.

According to a first aspect of the present invention there is provided a portable electronic device comprising:
  an infra-red input/output communications port arranged in a first mode of operation to transmit data between the portable device and a remote electronic device via a wireless transmission link; and
  coupling means associated with said infra-red communications port for coupling a first end of a data transmission cable to the infra-red communications port,
  whereby in a second mode of operation said first end of the cable is coupled to the infra-red communications port of the portable device and a second end of the cable is connected to a remote electronic device and data is transmitted between the portable device and the remote electronic device via said infra-red communications port and the cable.

Embodiments of the present invention facilitate wireless data transmission when a wireless connection can be established between two IR ports and, when this is not possible, use of the same I/R input/output port on the portable electronic device to transmit data via a transmission cable.

According to a second aspect of the present invention there is provided a data transmission system comprising:
  a portable electronic device according to the above first aspect of the present invention;
  a remote electronic device having an infra-red input/output communications port which in said first mode of operation forms part of said wireless transmission link; and
  a data transmission cable having a first end arranged to co-operate with said coupling means to couple the cable to said infra-red communications port of the portable electronic device, and a second end arranged to be coupled to either the infra-red communications port of the remote electronic device or to another communications port thereof.

In one embodiment of the present invention, the data transmission cable is an optical cable, and said first end of the data transmission cable is arranged to couple IR light from the IR port of the portable device into the cable and vice versa. The second end of the data transmission cable may be similarly arranged to couple IR light from said IR port of the remote device into the cable and vice versa. Alternatively, where the second end of the optical cable is arranged to be coupled to another input/output port of the remote device, and that port is an electromechanical port, the second end of the cable may comprise a transducer for converting IR light signals into electrical signals and vice versa. The transducer may also comprise a protocol converter for converting serial protocol data (e.g. RS232, USB) into IR protocol data (e.g. IrDA) and vice versa. The converter(s) may be implemented either in hardware or in software.

In an alternative embodiment of the present invention, said data transmission cable is an electrical transmission cable and said first end of the cable comprises a transducer arranged to convert IR light signals into electrical signals and vice versa. The transducer may also comprise a protocol converter for converting serial protocol data (e.g. RS232, USB) into IR protocol data (e.g. IrDA) and vice versa.

The second end of the cable may comprise a connector for coupling the cable to an electromechanical input/output port of the remote electronic device or may comprise a transducer for coupling the cable to said IR port of the remote device and for converting IR light signals into electrical signals and vice versa.

In one embodiment of the present invention, the first end of the data transmission cable terminates at a cradle or holder which provides said co-operating coupling means.

In another embodiment of the invention, the portable electronic device is a mobile communication device such as a combined mobile telephone/PDA. The remote electronic device may be a 'hands-free' control unit.

According to a third aspect of the present invention there is provided a method of operating a portable electronic device having an infra-red input/output port, the method comprising:
  in a first mode of operation, transmitting data via wireless infra-red transmission between said infra-red port and an infra-red input/output port of a remote electronic device; and in a second mode of operation, coupling a first end of a data transmission cable to the infra-red input/output port of the portable electronic device and coupling a second end of the cable to an input/output port of a remote electronic device, and thereafter transmitting data between the two coupled ports via said data transmission cable.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
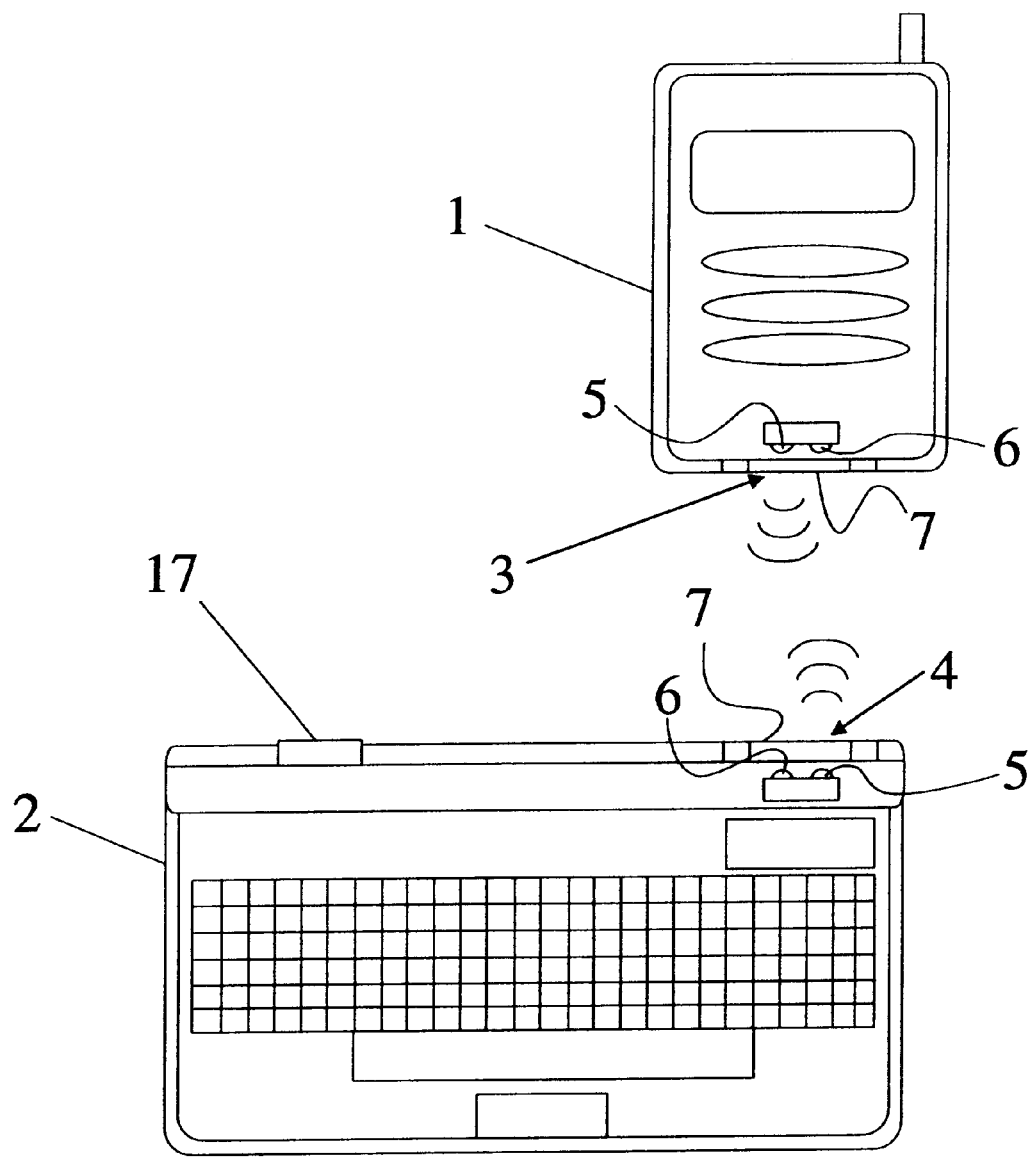
FIG. 1 shows schematically a mobile telephone in communication with a remote electronic device via an infra-red wireless transmission link.

There is illustrated in FIG. 1 a mobile telephone 1 and a notebook computer 2. Both devices are provided with respective infra-red (IR) input/output ports 3,4 which enable the bi-directional transmission of data between the two devices 1,2 when the devices have a direct line of sight to one another. An IR wireless link of this type is described in detail in EP0585030. The construction of the two ports 3,4 is substantially identical, each comprising an IR transmitter 5 and an IR receiver 6 shielded behind an IR transparent window 7. Data for transmission is formatted by the transmitting device 1,2 according to an IR transmission protocol (IrDA), e.g. by a central processing unit (CPU) of that device (not shown in the Figures).

In the event that no direct line of sight exists between the mobile telephone 1 and the computer 2, or corrupting electromagnetic interference is present, the IR wireless link may not function satisfactorily. Thus, an RS232 compatible electrical interconnecting cable 8 is provided (FIG. 2) which has first and second connectors 9,10 provided at its two ends for connection to the mobile telephone 1 and the computer 2 respectively. More particularly, and as shown in FIG. 3, the first connector 9 has a pair of locking pins 10a, 10b which are arranged to engage respective receiving apertures 11a, 11b provided on either side of the IR port 3 of the mobile telephone 1. The pins 10a, 10b and the apertures 11a, 11b provide a snap-lit coupling means which secures the first connector 9 in close proximity to the IR port 3. A release button 12 of the first connector 9 allows the connector to be removed from the IR port 3.

The first connector 9 is provided with an IR transparent window 13 which abuts or opposes the window 7 of the IR port 3 when the connector 9 is coupled to the port. An IR receiver 14 and transmitter 15 are situated behind the connector window 13 such that the transmitter 15 opposes the receiver 6 of the IR port 3 and the receiver 14 opposes the transmitter 5 of the port. The transmitter 15 and receiver 14 of the first connector 9 are coupled to interface electronics 16 located within the connector 9. In use, for IR signals transmitted from the port's transmitter 5 and received by the connector's receiver 14, the interface electronics 16 converts the resulting electrical signals from the IR protocol used by the mobile telephone 1 to RS232 protocol for transmission along the interconnecting cable 8. Conversely, electrical signals received over the cable 8 in RS232 form are converted by the interface electronics 16 into IR protocol for transmission from the transmitter 15 of the connector 9 to the receiver 6 of the IR port 3.

The second connector 10 is a standard electromechanical RS232 serial interface connector which is arranged to be plugged into a serial interface port 17 of the computer 2 to complete the connection between the mobile telephone 1 and the computer 2. This mode of operation allows the transmission of data between the two devices 1,2 even when the IR wireless transmission link is not operational.

Figure 2:
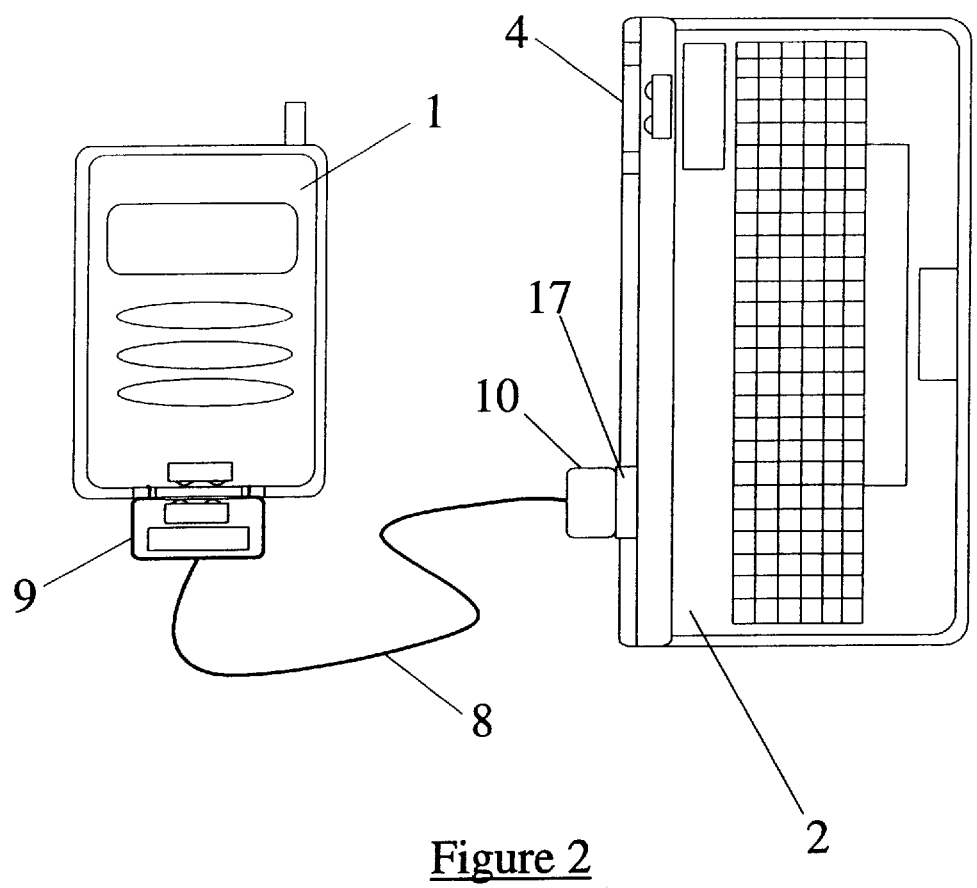
FIG. 2 shows schematically the devices of FIG. 1 communicating via an electrical cable.
Figure 3:
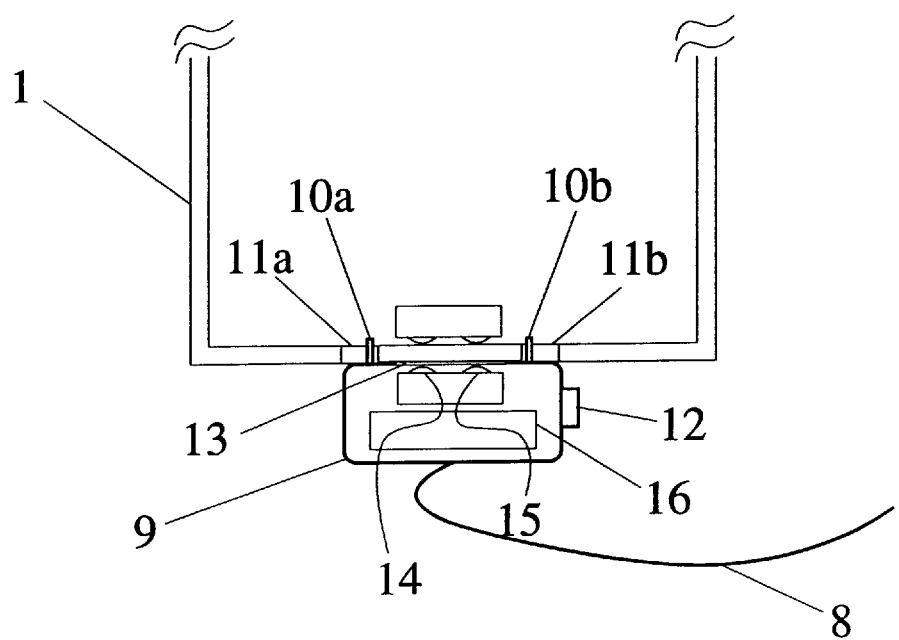
FIG. 3 shows in more detail an infra-red communications port of the mobile telephone of FIG. 2 with the cable coupled to the port.
Figure 4:
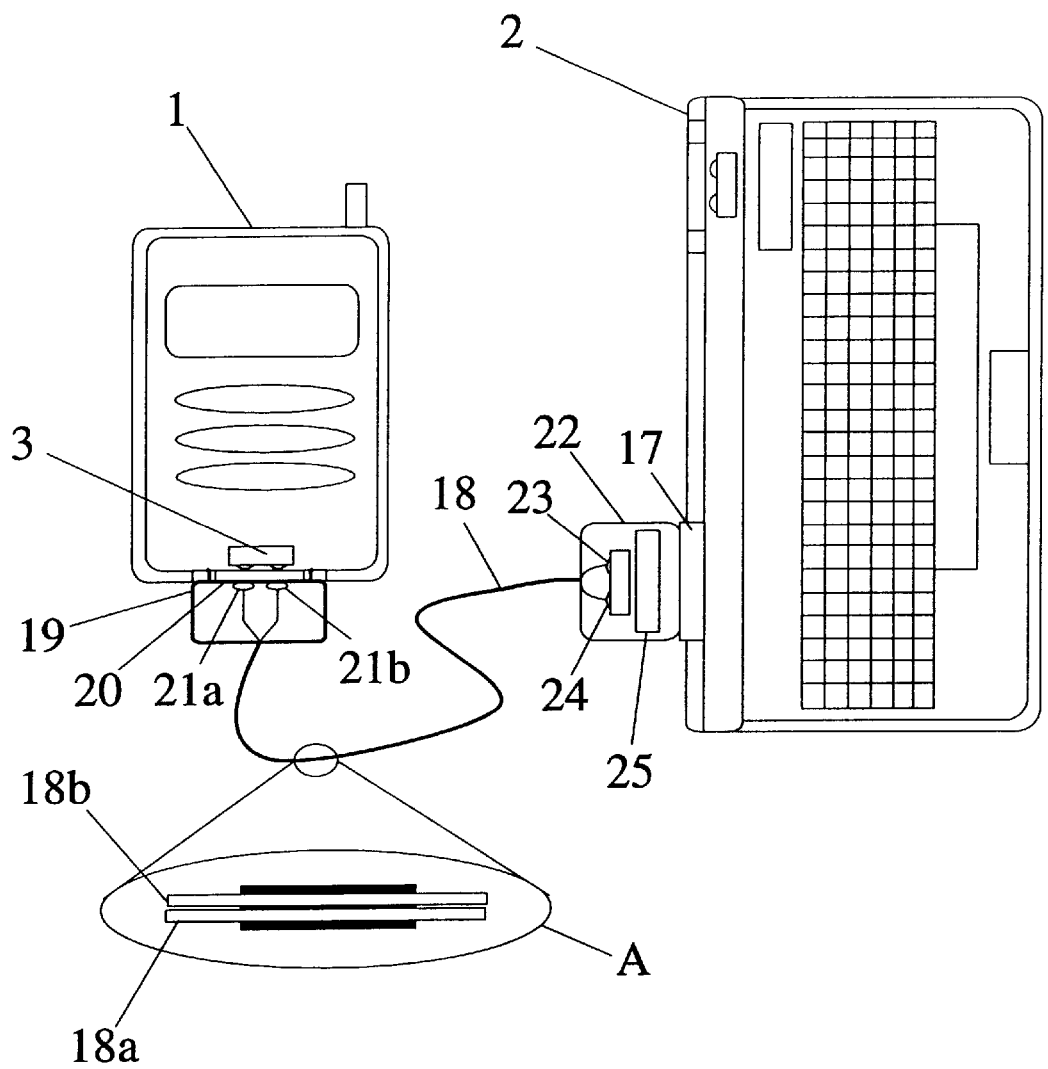
FIG. 4 shows schematically a mobile telephone and a remote electronic device communicating via an optical cable.

FIG. 4 shows an alternative embodiment of the present invention where the electrical cable of FIG. 2 is replaced by a fibre optic cable 18 having two fibres 18a, 18b (shown in the detail A in FIG. 4). One end of the cable 18 is provided with a connector 19 similar in external design to the first connector 9 described above with reference to FIGS. 2 and 3. However, inside the IR transparent window 20 of the connector 19, in place of the IR receiver and transmitter, the ends of the fibres 18a, 18b ;terminate at respective coupling lenses 21a, 21b. A first of the coupling lenses 21 a couples light transmitted through the windows 20,7 from the IR transmitter 5 into a first of the fibres 18a. Similarly, the second of the coupling lenses 21b couples light from the second fibre 18b to the IR receiver 6.

The other end of the fibre optic cable 18 is provided with a connector 22 arranged to be coupled to the standard serial interface port 17 of the computer 2. However, an interface is provided between the ends of the fibres 18a, 18b and the end termination. This interface comprises an IR receiver 23 and an IR transmitter 24 coupled via coupling lenses (not shown in the Figures) to the first and second fibres 18a, 18b respectively. The IR receiver 23 is in turn coupled to interface electronics 25 which converts signals received, via the cable 18, in IR protocol to RS232 protocol. Similarly, the IR transmitter 24 is coupled to the interface electronics 25 to receive signals converted from RS232 protocol to IR protocol.

It will be appreciated that in a further modification to the embodiment of FIG. 4, the fibre optic cable 18 may be coupled to the IR port 4 of the computer 2 via a connector identical to the connector 19 used to couple the cable 18 to the IR port 3 of the mobile telephone 1.

Figure 5:
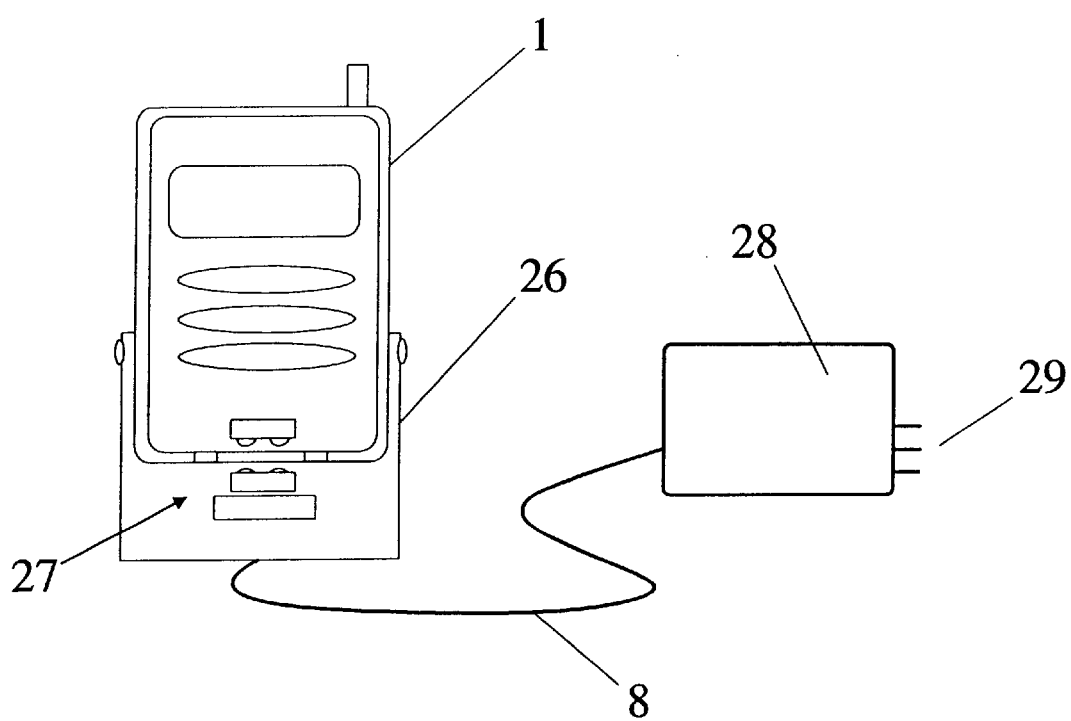
FIG. 5 shows schematically a mobile telephone seated in a cradle and coupled to a remote hands-free controller via an electrical cable.

FIG. 5 shows an embodiment of the present invention which is similar in principle to that of FIGS. 2 and 3. However, the connector of FIG. 3 is replaced by a cradle 26 of a type which is free standing and which can support the mobile telephone 1 in an upright position. The IR components 27 are contained within the cradle 26, opposed to (i.e. abutting or slightly spaced apart from) the transparent window 7 of the IR port 3. In the arrangement shown in FIG. 5, the remote electronic device is a hands-free controller 28 rather than a notebook computer. The controller has output pins 29 which can be connected to a microphone/loudspeaker, computer, and other units (not shown) of a hands-free telephone system. For certain applications, the cradle may be provided with an additional IR output port in for directly coupling IR signals between the telephone and some external device.

It will be appreciated by those of skill in the art that modifications may be made to the above described embodiments without departing from the scope of the present invention. For example, instead of providing a snap-fit coupling on the connector 19 (and/or on the connector 22) an interference or friction-fit coupling may be provided where pins on the connector(s) tightly engage receiving apertures in the telephone or vice versa. Other types of coupling will also be readily apparent.

What is claimed is:

1. A portable electronic device assembly comprising:
    a portable electronic device comprising:
        an infra-red input/output communications port arranged in a first mode of operation to transmit data between the portable electronic device and a remote electronic device via a wireless transmission link;
    a data transmission cable adapted to carry transmitted data between the portable device and the remote electronic device in a second mode of operation, the data transmission cable including an infra-red receiver/transmitter device situated behind an infra-red transparent window in the cable, the receiver/transmitter device being connected to an electronic interface located in the cable, the electronic interface adapted to convert electrical protocol signals and infra-red protocol signals; and
    a coupling mechanism associated with said infra-red communications port for coupling a first end of the data transmission cable to the infra-red communications port,
    wherein in the second mode of operation said first end of the cable is coupled to the infra-red communications port of the portable device and a second end of the cable is connected to the remote electronic device and data is transmitted between the portable device and the remote electronic device via said infra-red communications port and the cable.

2. A data transmission system comprising:
    a portable electronic device assembly according to claim 1;
    the remote electronic device having an infra-red input/output communications port which in said first mode of operation forms part of said wireless transmission link; and
    a first end of the data transmission cable adapted to cooperate with said coupling mechanism to couple the cable to said infra-red communications port of the portable electronic device assembly, and a second end arranged to be coupled to either the infra-red communications port of the remote electronic device or to another communications port thereof, the infra-red transparent window being located in the first end.

3. A system according to claim 2, wherein the data transmission cable is an optical cable, and said first end of the data transmission cable is arranged to couple IR light from the IR port of the portable device into the cable and vice versa.

4. A system according to claim 3, wherein the second end of the optical cable is arranged to be coupled to another input/output port of the remote device, and that port is an electromechanical port.

5. A system according to claim 4, wherein the second end of the cable comprises a transducer for converting IR light signals into electrical signals and vice versa.

6. A system according to claim 5, wherein the transducer comprises a protocol converter for converting serial protocol data into IR protocol data and vice versa.

7. A system according to claim 2, wherein said data transmission cable is an electrical transmission cable and said first end of the cable comprises a transducer arranged to convert IR light signals into electrical signals and vice versa.

8. A system according to claim 7, wherein the second end of the cable comprises a connector for coupling the cable to an electromechanical input/output port of the remote electronic device.

9. A system according to claim 7, wherein the second end of the cable comprises a transducer for coupling the cable to said IR port of the remote device and for converting IR light signals into electrical signals and vice versa.

10. A system according to claim 2, wherein the first end of the data transmission cable terminates at a cradle or holder which provides said co-operating coupling means.

11. A data transmission cable for use in the system of claim 2 and having a first end arranged to cooperate with said coupling means to couple the cable to said infra-red communications port of the portable electronic device, and a second end arranged to be coupled to either the infra-red communications port of the remote electronic device or to another communications port thereof.

12. A system according to claim 3, wherein the second end of the data transmission cable is arranged to couple IR light from said IR port of the remote device into the cable and vice versa.

13. A method of operating a portable electronic device having an infra-red input/output port, the method comprising:
    in a first mode of operation, transmitting data via wireless infra-red transmission between said infra-red port and an infra-red input/output port of a remote electronic device; and
    in a second mode of operation, coupling a first end of a data transmission cable to the infra-red input/output port of the portable electronic device and coupling a second end of the cable to an input/output port of a remote electronic device, and thereafter transmitting data between the two coupled ports via said data transmission cable, and wherein the data transmission cable is adapted to convert an infra-red protocol signal from the infra-red input/output port of the portable electronic device into an electrical protocol signal for transmission of the electrical protocol signal to the remote electronic device, and is further adapted to convert an electrical protocol signal from the remote electronic device into an infra-red protocol signal for transmission of the infra-red protocol signal to the portable electronic device.

14. A system for transmitting data between one or more independently operating electronic devices comprising:
    a portable electronic device having an infra-red input/output communications port;
    a remote electronic device having an electrical protocol input/output communications port, wherein the infra-red communications port is arranged in a first mode of operation to transmit data between the portable electronic device and the remote electronic device via a wireless transmission link;
    a data transmission cable having an integrated transducer/converter that is operably coupled between the portable device and the remote device to convert and transmit data between the devices in a second mode of operation, the transducer/converter including an infra-red receiver/transmitter device situated behind an infra-red transparent window in the cable adapted to be coupled to the infra-red input/output communications port, the transducer/converter being adapted to convert electrical protocol signals and infra-red protocol signals.

15. A system for transmitting data between a mobile telephone and a computer comprising:

an infra-red input/output port on the telephone being adapted to transmit data via a wireless link to the computer in a first mode of operation:

an interconnecting cable having a first connector at one end and a second connector at its other end, and wherein the first connector includes an infra-red receiver and an infra-red transmitter situated behind an infra-red transparent window in the first connector, the receiver and transmitter being connected to interface electronics located within the connector and the second connector comprises an electromechanical serial interface connector adapted to be plugged into a serial interface port of the computer to complete the connection between the mobile telephone and computer in a second mode of operation; and wherein the interface electronics are adapted to convert an infra-red protocol signal from the infra-red input/output port of the telephone into an electrical protocol signal for transmission to the computer, and convert an electrical protocol signal from the computer into an infra-red protocol signal for transmission to the telephone.

16. The system of claim 15, wherein the interconnecting cable is a fiber optic cable having two fibers and wherein a first end of the fibers terminate at a pair of respective coupling lenses in the first connector, and wherein the second connector includes a signal converter interface between a second end of the fibers and a second end termination;

the interface comprising an infra-red receiver/transmitter coupled via coupling lenses to the first and second fibers;

the infra-red receiver being coupled to the interface to convert signals received via the cable in infra-red signal protocol to RS232 signal protocol; and the infra-red transmitter being coupled to the interface to receive signals converted from RS232 signal protocol to infra-red signal protocol.

* * * * *